(12) United States Patent
Mironets et al.

(10) Patent No.: US 9,682,424 B2
(45) Date of Patent: Jun. 20, 2017

(54) ABSORBED IMPURITIES REDUCTION IN ADDITIVE MANUFACTURING SYSTEMS

(71) Applicant: United Technologies Corporation, Hartford, CT (US)

(72) Inventors: Sergey Mironets, Charlotte, NC (US); Michael C. Reiter, South Windsor, CT (US); Agnes Klucha, Colchester, CT (US); Youping Gao, Thousand Oaks, CA (US)

(73) Assignee: United Technologies Corporation, Farmington, CT (US)

( * ) Notice: Subject to any disclaimer, the term of this patent is extended or adjusted under 35 U.S.C. 154(b) by 775 days.

(21) Appl. No.: 14/066,013

(22) Filed: Oct. 29, 2013

(65) Prior Publication Data
US 2014/0178241 A1    Jun. 26, 2014

Related U.S. Application Data

(60) Provisional application No. 61/745,708, filed on Dec. 24, 2012.

(51) Int. Cl.
| | | |
|---|---|---|
| *B33Y 40/00* | (2015.01) | |
| *B33Y 30/00* | (2015.01) | |
| *B22F 1/00* | (2006.01) | |
| *B22F 3/105* | (2006.01) | |

(52) U.S. Cl.
CPC .......... *B22F 1/0085* (2013.01); *B22F 3/1055* (2013.01); *B22F 2003/1056* (2013.01); *B22F 2999/00* (2013.01); *Y02P 10/295* (2015.11); *Y10T 137/0318* (2015.04); *Y10T 137/8593* (2015.04)

(58) Field of Classification Search
CPC ...... B22F 3/003; B22F 3/1055; B22F 1/0085; B33Y 10/00; B33Y 30/00; B33Y 40/00; B33Y 70/00; B33Y 80/00; B33Y 99/00
See application file for complete search history.

(56) References Cited

U.S. PATENT DOCUMENTS

| | | | |
|---|---|---|---|
| 2,306,665 A | 12/1942 | Schwarzkopf | |
| 2,340,346 A | 2/1944 | Riveroll | |
| 2,759,808 A | 8/1956 | Kuzmick et al. | |
| 2,912,320 A | 11/1959 | Chang | |
| 3,214,264 A | 10/1965 | Bogdandy | |
| 3,353,951 A | 11/1967 | Shafer et al. | |
| 3,419,383 A | 12/1968 | Hatcher et al. | |
| 3,957,482 A | 5/1976 | Whigham | |
| 3,966,454 A | 6/1976 | Ito et al. | |
| 4,147,334 A | 4/1979 | Lafont et al. | |
| 4,209,320 A | 6/1980 | Kajinaga et al. | |
| 4,294,609 A | 10/1981 | Taricco | |
| 5,405,572 A | 4/1995 | DeVolk | |

FOREIGN PATENT DOCUMENTS

GB         818236        8/1959

OTHER PUBLICATIONS

Article entitled, "Continuous Mesh Belt Sintering Furnace", Advanced Corporation for Materials & Equipments, Alibaba.com, pp. 1-4, accessed Oct. 28, 2013.

*Primary Examiner* — Jonathan Johnson
*Assistant Examiner* — Anthony Liang
(74) *Attorney, Agent, or Firm* — Kinney & Lange, P.A.

(57) ABSTRACT

A pulverant material supply system has an outer shell, an inner shell, and a plurality of openings to a passage within the inner shell to allow a reducing fluid into the pulverant material contained therein. The liner is made from a non-evaporable getter alloy.

20 Claims, 5 Drawing Sheets

ABSORBED IMPURITIES REDUCTION IN ADDITIVE MANUFACTURING SYSTEMS

BACKGROUND

Additive manufacturing systems often utilize powdered, pulverant materials. An additive manufacturing system is one which selectively builds up a desired article. Known additive manufacturing systems include those using stereolithography, direct metal laser sintering, selective laser sintering, laser engineered net shaping, electron beam melting, laser powder deposition, and e-beam wire melting techniques, among others.

Several known additive manufacturing systems require pulverant feedstock. For example, direct metal laser sintering is used to construct finished parts from a stack of sintered layers of a pulverant metal. In general, finer pulverant material allows for thinner layers to be sintered, which in turn allows for ever-finer features to be constructed. However, finer pulverant material also results in higher surface area of the feedstock material. Higher surface area results in high absorption rates of contaminants. For example, pulverant Nickel-based superalloys often contain oxygen content in the range of 250 ppm or higher.

While pulverant feedstock is generally kept in an inert atmosphere, greater surface area presents a greater challenge for keeping the pulverant feedstock contaminant-free. In applications where the feedstock must have a low level of impurities such as oxygen, hydrogen, or carbonaceous gases, increasing surface area presents a challenge.

SUMMARY

A pulverant material supply system has an outer shell, an inner shell, and a plurality of openings to a passage within the inner shell to allow a reducing fluid into the pulverant material contained therein. The liner is made from a non-evaporable getter alloy.

A method of conditioning the pulverant material includes positioning a pulverant material inside a liner made of a non-evaporable getter alloy, heating the liner to an activation temperature, and passing an inert gas through the liner.

Additive manufacturing systems may be constructed incorporating a source of radiation, a reservoir of pulverant material, a liner adjacent to the reservoir, the liner having a passage in fluid communication with a plurality of bleed holes, a pulverant material supply system configured to provide conditioned pulverant material from the reservoir to a work stage, and an optical positioning system configured to direct radiation from the source of radiation towards the conditioned pulverant material at the work stage.

DETAILED DESCRIPTION

Figure 1:
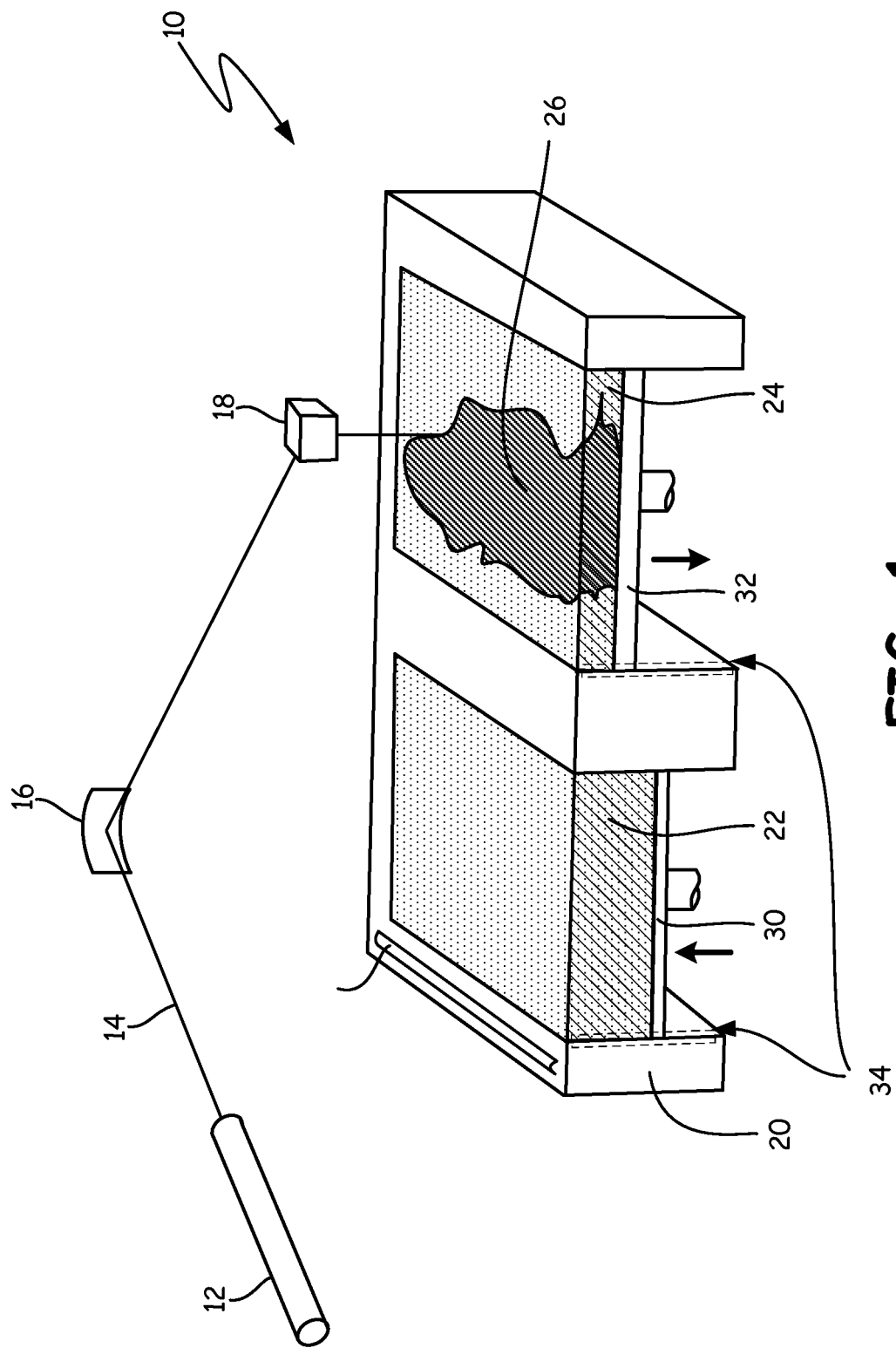
FIG. 1 is a cross-sectional view of a system for direct metal laser sintering.

FIG. 1 is a perspective view of an additive manufacturing apparatus. In particular, FIG. 1 shows a direct metal laser sintering apparatus. Additive manufacturing system 10 includes radiation source 12, radiation beam 14, mirror 16, movable optical head 18, frame 20, pulverant material supply 22, pulverant material bed 24, sintered pulverant material 26, spreader 28, pulverant supply support 30, stack support 32, and liner 34. Additive manufacturing system 10 may be used to create additively manufactured components. Many alternative designs of additive manufacturing devices are possible. Various additive manufacturing devices are commercially available. These devices perform additive manufacturing through processes known as selective laser sintering, direct metal laser sintering, stereolithography, laser-engineered net shaping, laminated object manufacturing, e-beam melting, and laser powder deposition, among others. FIG. 1 merely illustrates one potential additive manufacturing system for creating an additively manufactured part.

Radiation source 12 may be any source capable of creating focused radiation. For example, radiation source 12 may be a laser or an electron beam. Radiation beam 14 is a beam of focused or focusable radiation, such as a laser beam or an electron beam. Mirror 16 is present in some embodiments to deflect radiation in a desired direction. Movable optical head 18 is present in some embodiments, and also deflects radiation in a desired direction. For example, movable optical head 18 may include a mirror and be attached to an x-y positioning device. Frame 20 is used to contain pulverant material, in pulverant material supply 22 and in pulverant material bed 24. Pulverant material supply 22 and pulverant material bed 24 include pulverant material, such as granular or powdered metals, ceramics, or polymers. Pulverant material bed 24 further includes sintered pulverant material 26. Sintered pulverant material 26 is pulverant material contained within pulverant material bed 24 which has been at least partially sintered or melted. Spreader 28 is a spreading device which may transfer pulverant material from pulverant material supply 22 to pulverant material bed 24. Pulverant supply support 30 and stack support 32 are used to raise and/or lower material thereon during additive manufacturing. Liner 34 is a permeable liner which may be heated, and is used to remove impurities from pulverant material supply 22.

Radiation source 12 creates radiation beam 14 which can be used for melting, sintering, or cutting. Radiation source 12 is pointed towards mirror 16, which is arranged to deflect incident radiation toward moving optical head 18. Generally, radiation beam 14 will be targeted within frame 20, which holds pulverant material in pulverant material supply 22 and pulverant material bed 24. At least some of the pulverant material in pulverant material bed 24 is at least partially sintered or melted to form sintered pulverant material 26. Spreader 28 is positioned along frame 20 in order to move pulverant material between pulverant material supply 22 and pulverant material bed 24. Pulverant supply support 30 and stack support 32 are positioned within frame 20 so as to raise or lower materials thereon. Liner 34 surrounds pulverant material in pulverant material supply 22.

Radiation source 12 generates radiation beam 14. Radiation beam 14 travels to mirror 16, and is redirected by mirror 16 towards moving optical head 18. Moving optical head directs radiation beam 14 towards areas within pulverant material bed 24 in frame 20, which are melted or sintered. Sintered pulverant material 26 includes a layer of a desired additively manufactured component. Voids may be created in the desired component by not sintering or melting those portions of sintered pulverant material 26. After each layer of the desired additively manufactured component is finished, pulverant supply support 30 raises the height of pulverant material supply 22 with respect to frame. Likewise, stack support 32 lowers the height of pulverant material bed 24 with respect to frame 20. Spreader 28 transfers a layer of pulverant material from pulverant material supply 22 to pulverant material bed 24. During this process, liner 34 allows reducing and/or inert gas to pass through pulverant material supply 22. By choosing a liner of an appropriate non-evaporable getter alloy, such as a zirconium-based liner, and heating the liner above an activation temperature above which the liner absorbs contaminants, the level of contamination in the pulverant material may be reduced. For example, for many zirconium-based liners 34, heating the liner above 200° C. and passing Argon through liner 34 allows for absorption of oxygen, hydrogen, and carbonaceous gases by liner 34. Higher temperature is generally more effective at removing contaminants. For example, liner 34 may be heated above 400° C. to remove contaminants more effectively.

By repeating the process several times, an object may be constructed layer by layer. Components manufactured in this manner may be made as a single, solid component, and are generally stronger if they contain a smaller percentage of oxygen, hydrogen, or carbonaceous gases. Embodiments of the present invention reduce the quantity of impurities of, for example, oxygen, to less than 50 ppm, or even less than 20 ppm. Liner 34 aids in removing these contaminants, for example by using an absorbing material to form a porous liner, and heating the absorbing material above its activation temperature.

In alternative embodiments of the invention, additive manufacturing system 10 need not be a direct metal laser sintering apparatus. Additive manufacturing system 10 could be any system which utilizes pulverant feedstock, such as selective laser sintering (sintering of non-metal powders), e-beam melting (similar to direct metal laser sintering, but using an electron beam in place of laser 12), or laser powder deposition (in which pulverant material is deposited only at the point of lasing, such that substantially all of the deposited pulverant material is sintered).

Figure 2:
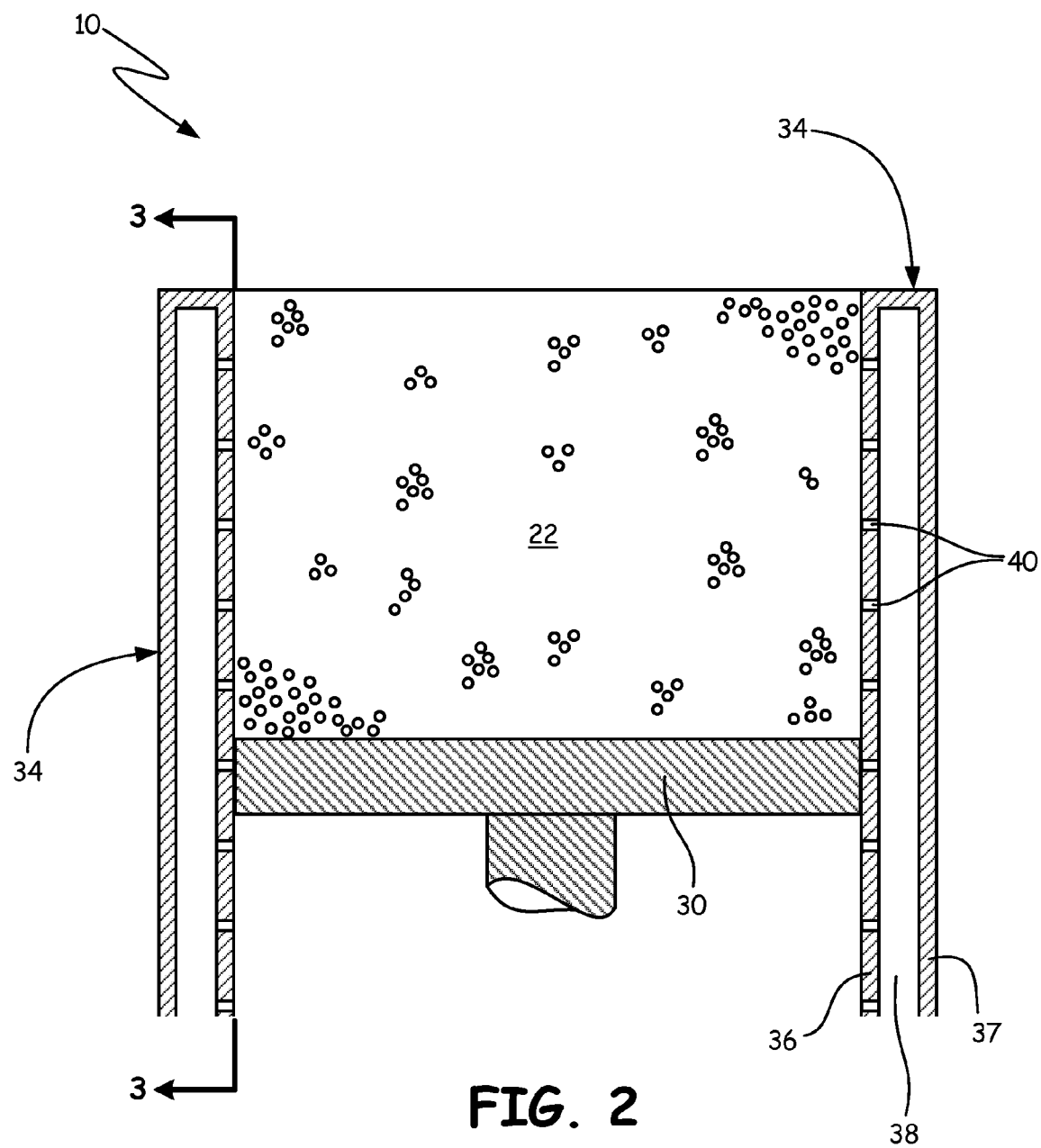
FIG. 2 is a cross-sectional view of a pulverant material feedstock container for direct metal laser sintering.

FIG. 2 is a cross-sectional view of a portion of additive manufacturing system 10 of FIG. 1. In particular, FIG. 2 shows pulverant material supply 22, pulverant supply support 30, and liner 34. Liner 34 includes inner shell 36, outer shell 37, passage 38, and bleed holes 40. Pulverant material supply 22 is a mass of pulverant material supported by pulverant supply support 30. Pulverant supply support 30 moves along a surface of liner 34. Liner 34 contains pulverant material supply 22, and also allows for reduction of oxides and removal of other undesirable impurities in pulverant material supply 22. Liner 34 includes inner shell 36 and outer shell 37, which surround passage 38, and inner shell 36 contains bleed holes 40. Inner shell 36 and/or outer shell 37 may be made of a material with reducing characteristics, such as a zirconium-based alloy.

Passage 38 allows for transmission of fluid through liner 34. For example, liner 34 may transmit argon, nitrogen, or another inert or reducing gas. Bleed holes 40 are formed in inner shell 36 of liner 34 to allow fluid to pass from liner 34 to pulverant material supply 22. Liner 34 may be heated, for example by heating a fluid passing through passage 38, or by attaching a heater (not shown) to frame 20 of FIG. 1 or liner 34. Liner 34 has an activation temperature, above which impurities are absorbed, as described with respect to FIG. 1. Bleed holes 40 are smaller than the particles that make up pulverant material supply 22, so that powder cannot escape from pulverant material supply 22. Thus, heated gas may be passed through liner 34, resulting in removal of impurities from pulverant material supply 22.

Figure 3:
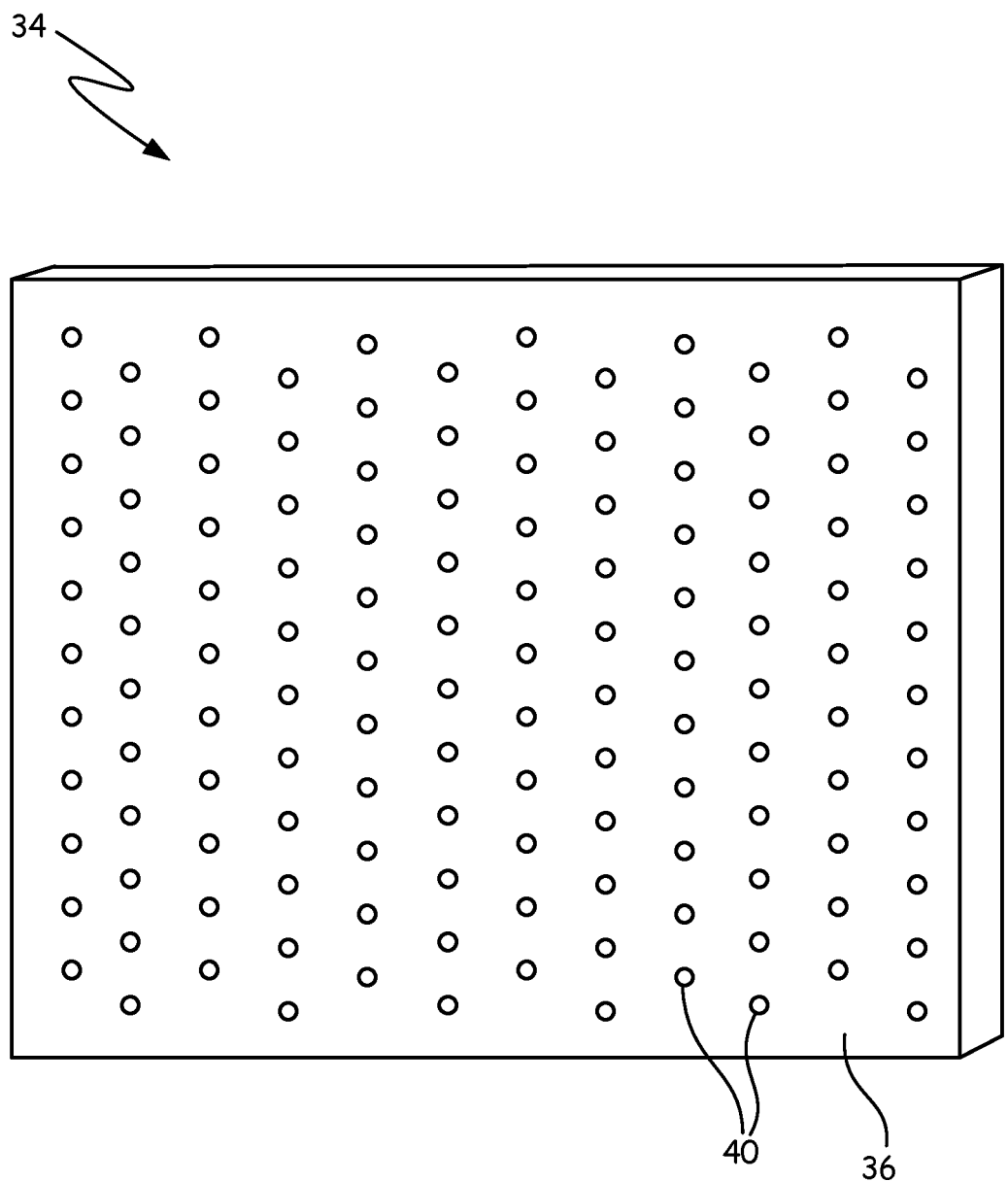
FIG. 3 is a cross-section view of a liner of the pulverant material feedstock container of FIG. 2 along line 3-3.

FIG. 3 is a perspective view of liner 34 taken along line 3-3 of FIG. 2. FIG. 3 shows one potential arrangement of bleed holes 40 in liner wall 36 of liner 34. In alternative embodiments, other shapes of liner 34 and other patterns for bleed holes 40 may be used, for example as described with respect to FIG. 5.

Figure 4:
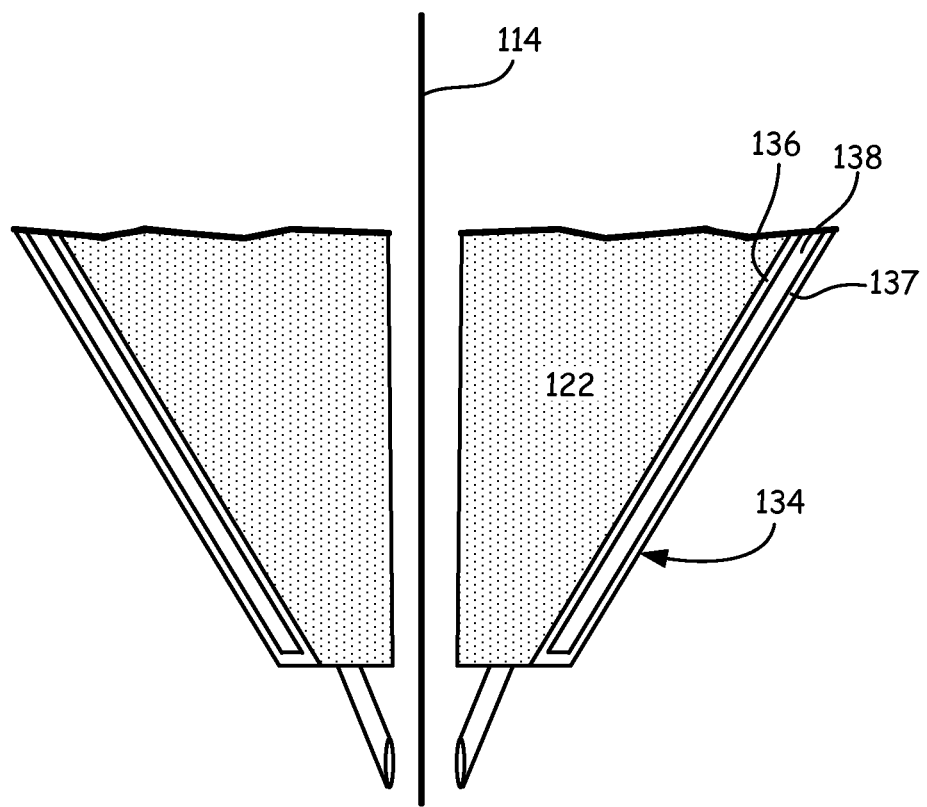
FIG. 4 is a perspective view of a pulverant material feedstock container for selective laser sintering.

FIG. 4 is a cross-sectional view of a laser powder deposition system incorporating the invention. FIG. 4 includes radiation beam 114, pulverant material supply 122, liner 134, inner shell 136, outer shell 137, passage 138, and deposition tubes 142. Pulverant material supply 122 is connected to deposition tubes 142, such that pulverant material leaving pulverant material supply 122 via deposition tubes 142 transects radiation beam 114. Liner 134 surrounds pulverant material supply 122. Liner 134 includes inner shell 136, outer shell 137, passage 138, and bleed holes 140 (FIG. 5) in inner shell 136. In the embodiment shown in FIG. 4, liner 134 is an annular container holding pulverant material supply 122. As described with respect to FIGS. 1-3, liner 134 may be made of a material capable of removing impurities from pulverant material supply 122, such as a zirconium-based alloy. Passage 138 allows for transmission of inert or reducing liquids to pulverant material supply 122.

As described with respect to FIGS. 1-3, powder material in pulverant material supply 122 may include undesirable impurities. Liner 134 may be heated to an activation temperature sufficient to enable removal of impurities. Fluid, such as Argon or another inert gas, may be circulated through passage 138 and into pulverant material supply 122, removing impurities.

Figure 5:
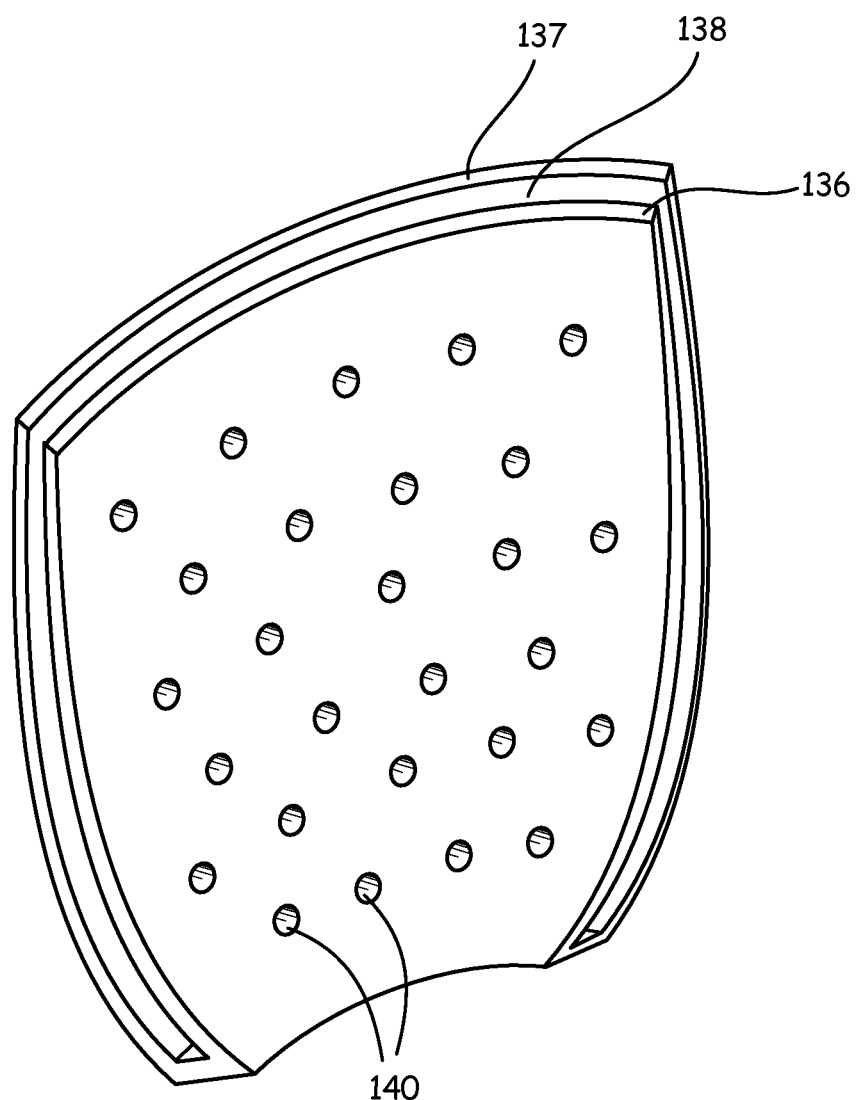
FIG. 5 is a cross-sectional view of a liner of the pulverant material feedstock container of FIG. 4.

FIG. 5 is a partial cutoff view of liner 134. Liner 134 is substantially annular in this embodiment, but in other embodiments may take any shape capable of holding pulverant material 122 (FIG. 4). FIG. 5 shows inner shell 136, passage 138, and bleed holes 140. Bleed holes 140 are arranged along the surface of liner 134 where pulverant material supply 122 is arranged, as described with respect to FIG. 4. Bleed holes 140 are in fluid communication with passage 138, such that fluid circulated through passage 138 also passes through pulverant material supply 122.

LISTING OF POTENTIAL EMBODIMENTS

A pulverant material supply system includes an outer shell, an inner shell disposed within the outer shell and shaped to contain pulverant material, comprising a plurality of openings therein to allow for the passage of a fluid, and wherein the inner shell is formed from a non-evaporable getter alloy, and a fluid passage between the inner shell and the outer shell. The pulverant material supply system may further include a pulverant material disposed within the inner shell. The pulverant material supply system with pulverant material disposed within the inner shell may have a plurality of openings each having a diameter smaller than the diameter of a pulverant material.

The pulverant material supply system may incorporate a zirconium alloy as the non-evaporable getter alloy. The pulverant material supply system may incorporate an inner shell connected to a heat source, the heat source capable of heating the inner shell to an activation temperature of the non-evaporable getter alloy. The activation temperature of the non-evaporable getter alloy may be greater than 200° C., or greater than 400° C.

A method of conditioning a pulverant material for additive manufacturing includes positioning a pulverant material within a conditioning system, the conditioning system including a liner made of a non-evaporable getter alloy; heating the liner an activation temperature; and passing an inert gas through the liner. The activation temperature may exceed 200° C., or even 400° C. The method may include continuing to pass the inert gas through the heated liner until less than a desired low proportion of impurities remain in the pulverant material, such as 50 ppm or 20 ppm. The non-evaporable getter alloy may be a zirconium-based alloy. Conditioned pulverant material may be deposited on a pulverant material bed and at least partially sintered.

Additive manufacturing systems may be constructed incorporating a source of radiation, a reservoir of pulverant material, a liner adjacent to the reservoir, the liner having a passage in fluid communication with a plurality of bleed holes, a pulverant material supply system configured to provide conditioned pulverant material from the reservoir to a work stage, and an optical positioning system configured to direct radiation from the source of radiation towards the conditioned pulverant material at the work stage.

The additive manufacturing system may further include a mass of pulverant material contained within the liner. The additive manufacturing system may incorporate a liner including a non-evaporable getter alloy. The liner may be connected to a heater capable of heating the liner to at least an activation temperature of the non-evaporable getter alloy. The non-evaporable getter alloy may be zirconium-based.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A pulverant material supply system comprising:
an outer shell;
an inner shell disposed within the outer shell and shaped to contain pulverant material, comprising a plurality of openings therein to allow for the passage of a fluid, and wherein the inner shell is formed from a non-evaporable getter alloy, and
a fluid passage between the inner shell and the outer shell.

2. The pulverant material supply system of claim 1, and further comprising a pulverant material disposed within the inner shell.

3. The pulverant material supply system of claim 2, wherein the plurality of openings each have a diameter smaller than the diameter of a pulverant material.

4. The pulverant material supply system of claim 1, wherein the non-evaporable getter alloy is a zirconium alloy.

5. The pulverant material supply system of claim 1, wherein the inner shell is connected to a heat source capable of heating the inner shell to an activation temperature of the non-evaporable getter alloy.

6. The pulverant material supply system of claim 5, wherein the activation temperature of the non-evaporable getter alloy is greater than 200° C.

7. The pulverant material supply system of claim 6, wherein the activation temperature of the non-evaporable getter alloy is greater than 400° C.

8. A method of conditioning a pulverant material for additive manufacturing, the method comprising:
positioning a pulverant material within a conditioning system, the conditioning system including a liner, the liner comprising:
an outer shell; and
an inner shell disposed within the outer shell and shaped to contain pulverant material, comprising a plurality of openings therein to allow for the passage of a fluid, and wherein the inner shell is formed from a non-evaporable getter alloy;
heating the liner an activation temperature; and
passing an inert gas through a fluid passage between the inner shell and the outer shell of the liner.

9. The method of claim 8, wherein the activation temperature is at least 200° C.

10. The method of claim 8, wherein the activation temperature is at least 400° C.

11. The method of claim 8, and further comprising continuing to pass the inert gas through the heated liner until less than 50 ppm impurities remain in the pulverant material.

12. The method of claim 10, and further comprising continuing to pass the inert gas through the heated liner until less than 20 ppm impurities remain in the pulverant material.

13. The method of claim 8, wherein the non-evaporable getter alloy is a zirconium-based alloy.

14. The method of claim 8, and further comprising depositing conditioned pulverant material on a pulverant material bed.

15. The method of claim 14, and further comprising at least partially sintering the deposited conditioned pulverant material.

16. An additive manufacturing system, comprising:
a source of radiation;
a reservoir of pulverant material;
a liner adjacent to the reservoir, the liner comprising the outer shell, the inner shell, and the fluid passage of claim 1;
a pulverant material supply system configured to provide conditioned pulverant material from the reservoir to a work stage; and
an optical positioning system configured to direct radiation from the source of radiation towards the conditioned pulverant material at the work stage.

17. The additive manufacturing system of claim 16, wherein the reservoir includes a mass of pulverant material contained within the liner.

18. The additive manufacturing system of claim 16, wherein the liner includes a non-evaporable getter alloy.

19. The additive manufacturing system of claim 18, wherein the liner is connected to a heater capable of heating the liner to at least an activation temperature of the non-evaporable getter alloy.

20. The additive manufacturing system of claim 18, wherein the non-evaporable getter alloy is zirconium-based.

* * * * *